United States Patent
Kishore et al.

(10) Patent No.: US 9,736,030 B1
(45) Date of Patent: Aug. 15, 2017

(54) MONITORING NETWORK MANAGEMENT ACTIVITY

(75) Inventors: K. Uday Kishore, Karnataka (IN); Raja Sekhar Reddy, Hyderabad (IN)

(73) Assignee: Juniper Networks, Inc., Sunnyvale, CA (US)

( * ) Notice: Subject to any disclaimer, the term of this patent is extended or adjusted under 35 U.S.C. 154(b) by 650 days.

(21) Appl. No.: 13/337,781

(22) Filed: Dec. 27, 2011

(51) Int. Cl.
  *G06F 17/30* (2006.01)
  *H04L 12/24* (2006.01)

(52) U.S. Cl.
  CPC ........ *H04L 41/22* (2013.01); *G06F 17/30516* (2013.01)

(58) Field of Classification Search
  CPC ....... H04L 41/22; H04L 41/069; H04L 67/10; G06F 17/30516
  USPC ........................................ 707/705, 758, 769
  See application file for complete search history.

(56) References Cited

U.S. PATENT DOCUMENTS

| | | | | |
|---|---|---|---|---|
| 7,640,394 B2 * | 12/2009 | Kanno et al. | ................. | 711/112 |
| 7,653,742 B1 * | 1/2010 | Bhargava et al. | ............ | 709/240 |
| 2003/0055960 A1 * | 3/2003 | Hain | ............................ | 709/224 |
| 2003/0172151 A1 * | 9/2003 | Schade | ......................... | 709/224 |
| 2004/0215646 A1 | 10/2004 | Kaler et al. | | |
| 2006/0235977 A1 * | 10/2006 | Wunderlich et al. | ......... | 709/227 |
| 2007/0078770 A1 * | 4/2007 | Hsieh | ............................ | 705/51 |
| 2007/0294209 A1 * | 12/2007 | Strub et al. | ....................... | 707/1 |
| 2010/0145978 A1 * | 6/2010 | Anashkin et al. | ............ | 707/769 |
| 2010/0211826 A1 * | 8/2010 | Villella et al. | .................. | 714/39 |
| 2011/0035390 A1 * | 2/2011 | Whitehouse | .................. | 707/755 |
| 2011/0107300 A1 * | 5/2011 | Vidal et al. | .................... | 717/121 |

OTHER PUBLICATIONS

Distributed Management Task Force, Inc., "Desktop Management Interface Specification", Version 2.0.1s, Jan. 10, 2003, 245 pages.
Co-pending U.S. Appl. No. 13/291,240 entitled "Managing and Troubleshooting Changes in Device Configurations on a Network Node", by Kumbhari, filed Nov. 8, 2011, 44 pages.
Speed time to resolution with real-time, consolidated event analysis, Tivoli software, IBM Tivoli Netcool/Impact, Mar. 2007, 8 pages.
Service management solutions White paper, Tivoli software, Netcool + Tivoli: delivering service management innovation, Aug. 2006, 28 pages.

(Continued)

*Primary Examiner* — Shiow-Jy Fan
(74) *Attorney, Agent, or Firm* — Harrity & Harrity, LLP

(57) ABSTRACT

A device is configured to receive, from a network device, a first message associated with a network management activity performed by using an application of the network device. The device is further configured to determine whether the first message satisfies a criterion, and to classify the first message based on a type of the application when the first message satisfies the criterion. The device is also configured to receive, from the network device, a second message associated with the network management activity; to correlate the second message with the first message after classifying the first message; and to create a record for the network management activity based on the first message and the second message by using rules associated with the type of the application.

20 Claims, 9 Drawing Sheets

(56) References Cited

OTHER PUBLICATIONS

IBM Software Tivoli, IBM Tivoli Netcool/Impact, Streamline event and alert management, and incident and problem management processes, Dec. 2010, 8 pages.
Security Threat Response Manager, Adaptive Log Exporter Users Guide, Release 2009.1, Feb. 2010, 72 pages.

* cited by examiner

MONITORING NETWORK MANAGEMENT ACTIVITY

BACKGROUND

Communication networks typically include network devices, such as routers, firewalls, switches, or gateways, which transfer or switch data from one or more sources to one or more destinations. The network devices may operate on the data as the data traverses the network, such as by forwarding or filtering the data. Operators, such as network administrators, of the network devices may use different applications of the network devices to perform network management activities. Examples of network management activities may include updating security protocols, updating forwarding protocols, updating a virtual local area network (VLAN) configuration, etc. Each one of the applications may be developed independently and/or by different entities. As a result, the applications may be unable to communicate information regarding the network management activities to one another. Therefore, the operators may be unable to monitor all of the network management activities.

SUMMARY

According to one aspect, a method may include receiving, by a computing device and from a network device, a first message associated with a network management activity performed by using an application of the network device; determining, by the computing device, whether the first message satisfies a criterion; classifying, by the computing device, the first message based on a type of the application when the first satisfies the criterion; receiving, by the computing device and from the network device, a second message associated with the network management activity; correlating, by the computing device, the second message with the first message after classifying the first message; and creating, by the computing device, a record for the network management activity based on the first message and the second message by using rules associated with the type of application.

According to another aspect, a device may include a processor. The processor may receive, from a network device, a first message associated with a network management activity performed by using an application of the network device; determine whether the first message satisfies a criterion; classify the first message based on a type of the application when the first message satisfies the criterion; receive, from the network device, a second message associated with the network management activity; correlate the second message with the first message after classifying the first message; and create a record for the network management activity based on the first message and the second message by using rules associated with the type of the application.

According to still another aspect, one or more computer-readable media, containing one or more instructions, which when executed by at least one processor of a computing device, may cause the at least one processor to: receive, from a network device, a first message associated with a network management activity performed by using an application of the network device; determine whether the first message satisfies a criterion; classify the first message based on a type of the application when the first message satisfies the criterion; receive, from the network device, a second message associated with the network management activity; correlate the second message with the first message after classifying the first message; and create a record for the network management activity based on the first message and the second message by using rules associated with the type of the application.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

A system and/or method, described herein, may enable monitoring of network management activities. For example, a logging server may receive, from a network device, a message associated with a network management activity. The logging server may determine whether the message satisfies a criterion. In one example, the logging server may determine that a particular message satisfies the criterion when the particular message includes one or more particular parameters. When the logging server determines that the message satisfies the criterion, the logging server may classify the message based on a type of application used by the network device to perform the network management activity. Thereafter, the logging server may receive, from the network device, other messages that are associated with the network management activity, and may correlate the other messages to the original message. The logging server may create a record, based on the original message and the other messages, for the network management activity. The logging server may receive a request for information associated with the network activity from another network device. The logging server may retrieve the information from the record, and may provide the information in response to the request.

In one example implementation, each record may include information from messages that were generated by only a single network device when a particular application, of the single network device, was used to perform a network management activity during a single session. The single session may include, for example, a log-in event, a log-out event, and/or one or more other types of events that may occur between the log-in event and the log-out event. The log-in event may occur when an operator logs into the particular application to perform the network management activity. The log-out event may occur when the operator logs-out of the application at the end of the single session.

As a result, the logging server may organize, into records, information from messages associated with different network management activities that are performed by using different applications of different network devices. The logging server may provide information from the records to allow operators, such as network administrators, of network devices to make decisions as to which new network management activity needs to be performed based on the previous network activities. For example, an operator may decide to perform a network management activity to fix a problem caused by two conflicting network management activities.

Figure 1:
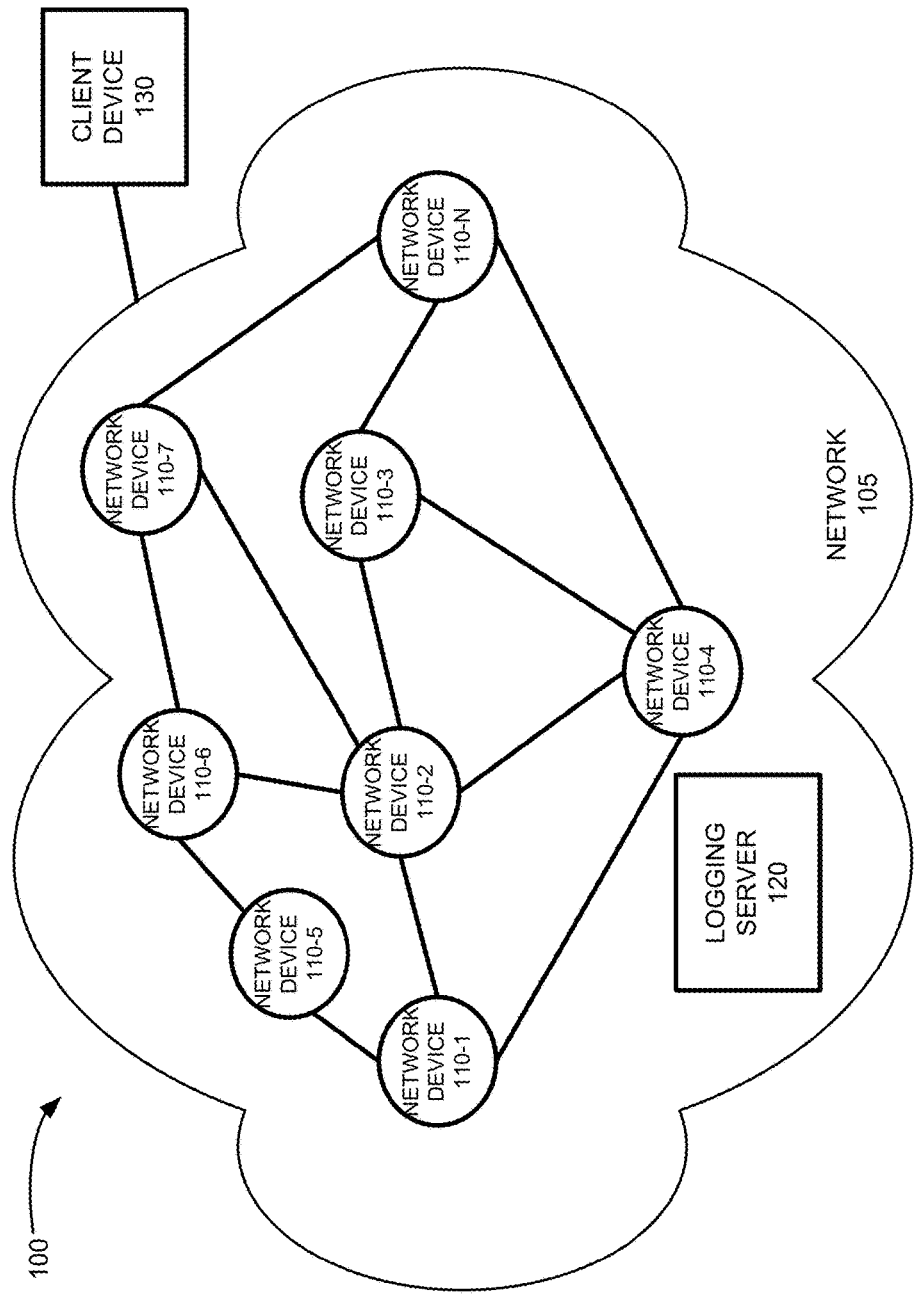
FIG. 1 is a diagram of an example network in which systems and/or methods described herein may be implemented.

FIG. 1 is a diagram of an example network 100 in which systems and/or methods described herein may be implemented. As shown in FIG. 1, network 100 may include a network 105, which includes a group of network devices 110-1, . . . , 110-N (where N≥1) (hereinafter referred to collectively as "network devices 110" and individually as "network device 110") and a logging server 120, and a client device 130. While FIG. 1 shows a particular number and arrangement of devices, network 100 may include additional, fewer, different, and/or differently arranged devices than are illustrated in FIG. 1. Alternatively, or additionally, one or more of the devices of network 100 may perform one or more functions described as being performed by another one or more of the devices of environment 100. Devices of network 100 may interconnect via wired connections, wireless connections, or a combination of wired and wireless connections.

Network 105 may include a service provider network, such as a local area network (LAN); a wide area network (WAN); a metropolitan area network (MAN); a telephone network (e.g., the Public Switched Telephone Network (PSTN) or a cell network); the Internet; or a combination of networks.

Network device 110 may include one or more network devices that receive traffic (e.g., packets) and forward the traffic toward its destination. For example, network device 110 may take the form of a routing device, a switching device, a multiplexing device, a firewall device, or a device that performs a combination of routing, switching, security functions, and/or multiplexing functions. In one implementation, network device 110 may be a digital device. In another implementation, network device 110 may be an optical device. In yet another implementation, network device 110 may be a combination of a digital device and an optical device.

Network device 110 may store one or more applications that are used to perform network management activities, as described further below with reference to FIG. 3. Examples of network management activities may include updating security protocols, updating forwarding protocols, updating a VLAN configuration, etc. Network device 110 may transmit messages associated with the network management activities to logging server 120.

Logging server 120 may include one or more server devices, or other types of devices, that gather, process, search, store, and/or provide information in a manner described herein. Logging server 120 may receive messages from network devices 110. Logging server 120 may determine which messages satisfy a criterion, and may correlate the messages that satisfy the criterion with other related messages. Logging server 120 may create records based on the correlated messages, and may provide information from the records in response to requests from operators of network devices 110.

Client device 130 may include any device used by an operator to access and/or use an application of network device 110. In one implementation, client device 130 may include a device that is capable of communicating with network device 110 via network 105. For example, client device 110 may include a radiotelephone; a personal communications system (PCS) terminal that may combine a cellular radiotelephone with data processing and data communications capabilities; a personal digital assistant (PDA) that can include a radiotelephone, a pager, Internet/intranet access, etc.; a wireless device (e.g., a wireless telephone); a smart phone; a workstation computer; a laptop computer; a personal computer; or other types of computation or communication devices. In another implementation, each network device 110, of one or more network devices 110, may include client device 130. In other words, the one or more network devices 110 may operate as client devices 130. Herein, "network device 110" may refer to client device 130 that is executing network management applications that are described below with reference to FIG. 3.

Figure 2:
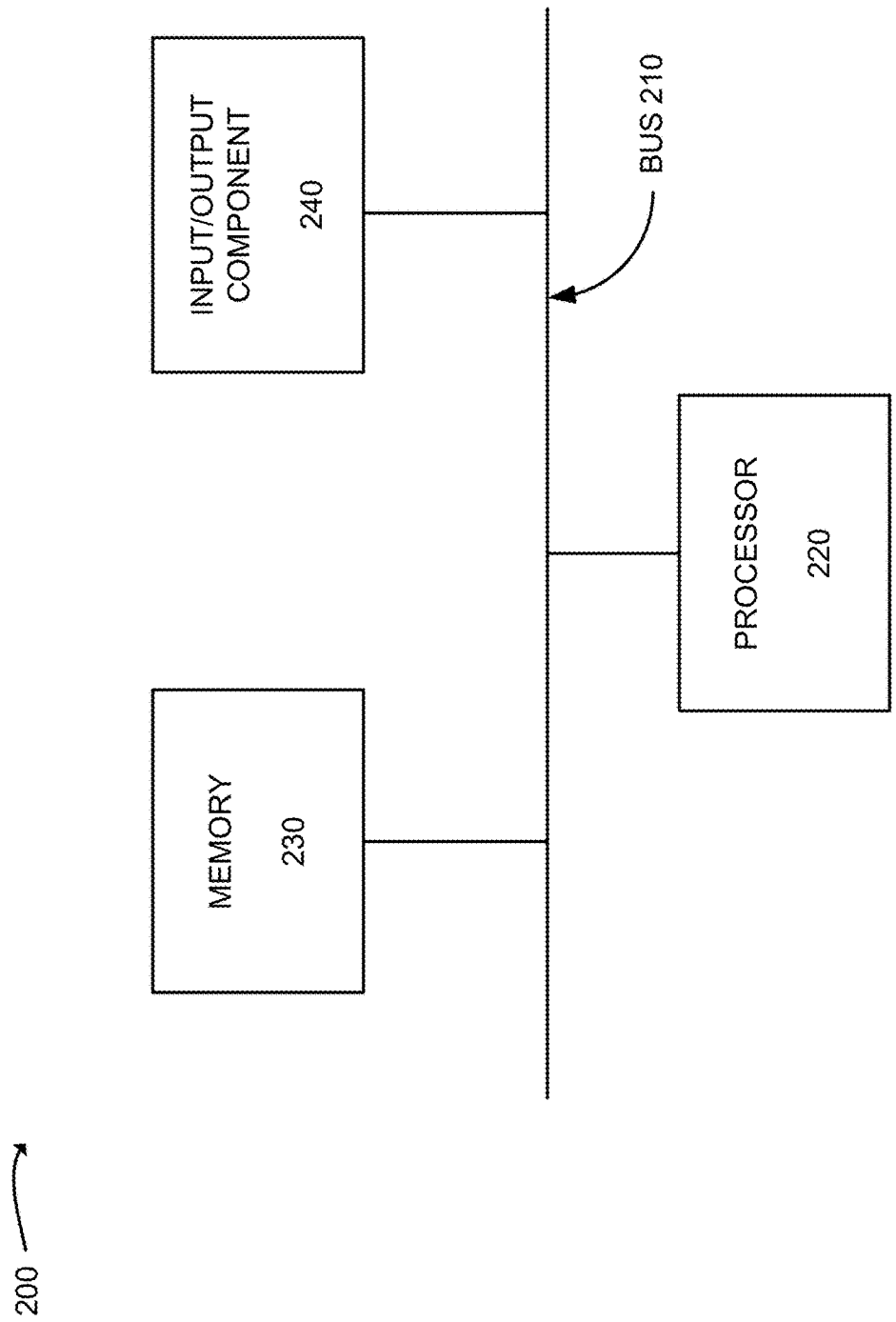
FIG. 2 is a diagram of example components of one or more devices of FIG. 1.

FIG. 2 is a diagram of example components of a device 200, which may correspond to network device 110 and/or logging server 120. Each one of network device 110 and/or logging server 120 may include one or more devices 200 and/or one or more of each one of the components of device 200. As shown in FIG. 2, device 200 may include a bus 210, a processor 220, a memory 230, and an input/output component 240.

Although FIG. 2 illustrates example components of device 200, in other implementations, device 200 may include additional components, fewer components, different components, or differently arranged components than those illustrated in FIG. 2 and described herein. Alternatively, or additionally, one or more components of device 200 may perform one or more tasks described as being performed by one or more other components of device 200.

Bus 210 may include a path that permits communication among the components of device 200. Processor 220 may include a processor, a microprocessor, or processing logic (e.g., an application specific integrated circuit (ASIC) or a field programmable gate array (FPGA)) that may interpret and execute instructions. Memory 230 may include a random access memory (RAM) or another type of dynamic storage device that may store information and instructions for execution by processor 220; a read only memory (ROM) or another type of static storage device that may store static information and instructions for use by processor 220; a magnetic and/or optical recording medium and its corresponding drive; and/or a removable form of memory, such as a flash memory.

Input/output component 240 may include a mechanism that permits an operator to input information to device 200, such as a keyboard, a keypad, a mouse, a button, a pen, a touch screen, etc., and/or a mechanism that outputs information to the operator, including a display, a light emitting diode (LED), a speaker, etc. Additionally, or alternatively, input/output component 240 may include any transceiver-like mechanism that enables device 200 to communicate with other devices and/or systems. For example, input/output component 240 may include a wired interface (e.g., an Ethernet interface, an optical interface, etc.), a wireless interface (e.g., a radio frequency (RF) interface, a wireless fidelity (Wi-Fi) interface, a Bluetooth interface, etc.), or a combination of a wired interface and a wireless interface.

As will be described in detail below, device 200 may perform certain operations. Device 200 may perform these and other operations in response to processor 220 executing software instructions (e.g., computer program(s)) contained in a computer-readable medium, such as memory 230, a secondary storage device (e.g., hard disk, CD-ROM, etc.), etc. A computer-readable medium may be defined as a non-transitory memory device. A memory device may include a space within a single physical memory device or spread across multiple physical memory devices. The software instructions may be read into memory 230 from another computer-readable medium or from input/output component 240. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
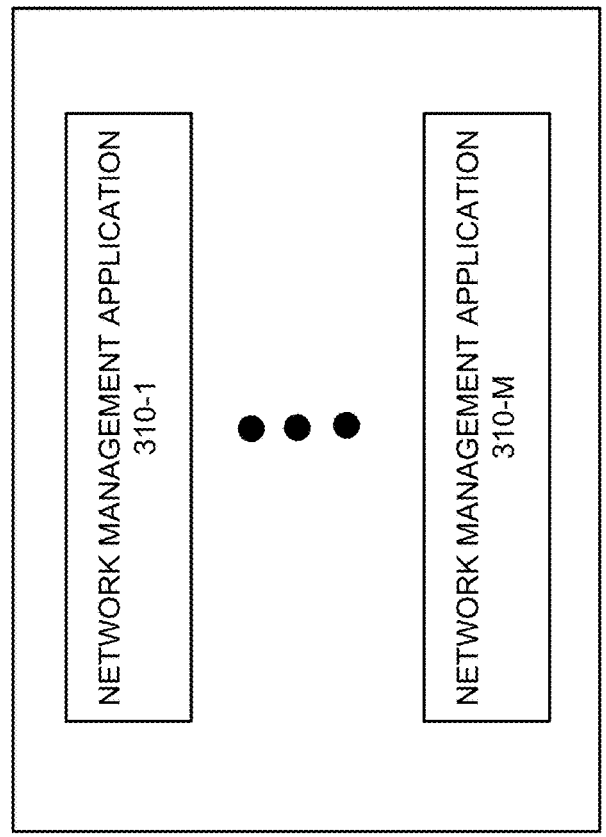
FIG. 3 is a diagram of example functional components of a network device of FIG. 1.

FIG. 3 is a diagram of example functional components of network device 110. As shown in FIG. 3, network device 110 may include a group of network management applications 310-1, . . . , 310-M (where M≥1) (hereinafter referred to collectively as "network management applications 310" and individually as "network management application 310").

Although FIG. 3 shows example functional components of network device 110, in other implementations, network device 110 may include fewer functional components, different functional components, and/or additional functional components than those depicted in FIG. 3. Alternatively, or additionally, one or more functional components of network device 110 may perform one or more tasks described as being performed by one or more other functional components of network device 110.

Network management application 310 may include an application that is used to perform a network management activity. The network management activity may include, for example, configuring network device 110, which executes network management application 310, and/or one or more other network devices 110. As one example, network management application 310 may include an element management system (EMS) application. An operator may use an EMS application to manage functions and/or capabilities within one or more network devices 110. As a second example, network management application 310 may include a network management systems (NMS) application. An operator may use an NMS application to manage traffic between network devices 110. In another example, network management application 310 may include an application that includes one or more functionalities of an EMS application and one or more functionalities of an NMS application. Network management application 310 may include additional or other types of applications that can be used to perform network management activities.

When network management application 310 is used to perform a network management activity, network management application 310 may generate a message associated with the network management activity. Network management application 310 may transmit the message to logging server 120. A message, as used herein, may refer to a system logging (syslog) message, a simple network management protocol (SNMP) message, or another type of message.

Figure 4:
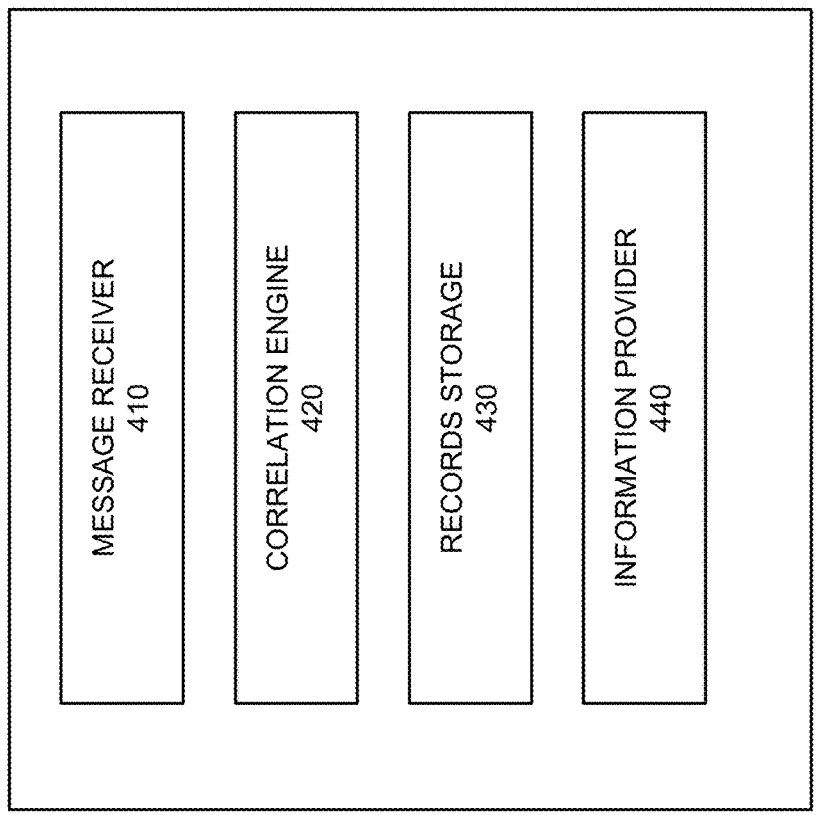
FIG. 4 is a diagram of example functional components of a logging server of FIG. 1.

FIG. 4 is a diagram of example functional components of a logging server 120. As shown in FIG. 4, logging server 120 may include a message receiver 410, a correlation engine 420, a records storage 430, and an information provider 440.

Although FIG. 4 shows example functional components of logging server 120, in other implementations, logging server 120 may include fewer functional components, different functional components, and/or additional functional components than those depicted in FIG. 4. Alternatively, or additionally, one or more functional components of logging server 120 may perform one or more tasks described as being performed by one or more other functional components of logging server 120.

Message receiver 410 may receive messages from network management applications 310 (FIG. 3) of network devices 110. Message receiver 410 may store the messages, and/or may forward the messages to correlation engine 420.

Correlation engine 420 may determine whether a particular message satisfies a criterion. When correlation engine 420 determines that the particular message satisfies the criterion, correlation engine 420 may correlate the particular message with other received messages that are related to the same network management activity as the particular message. Correlation engine 420 may create a record based on the correlated messages, including the particular message and the other received messages. As one example, a group of messages have been received relating to updating a forwarding protocol. Correlation engine 420 may correlate the messages, and may create a record based on information extracted from the group of messages.

Correlation engine 420 may store the record in records storage 430. Records storage 430 may store records that are associated with different network management activities.

Information provider 440 may provide information based on the records stored in records storage 430. In one example, information provider 440 may receive a search query from a user interface of an operator. Information provider 440 may identify one or more records based on the search query, and may provide information from the one or more identified records to the user interface.

Figure 5:
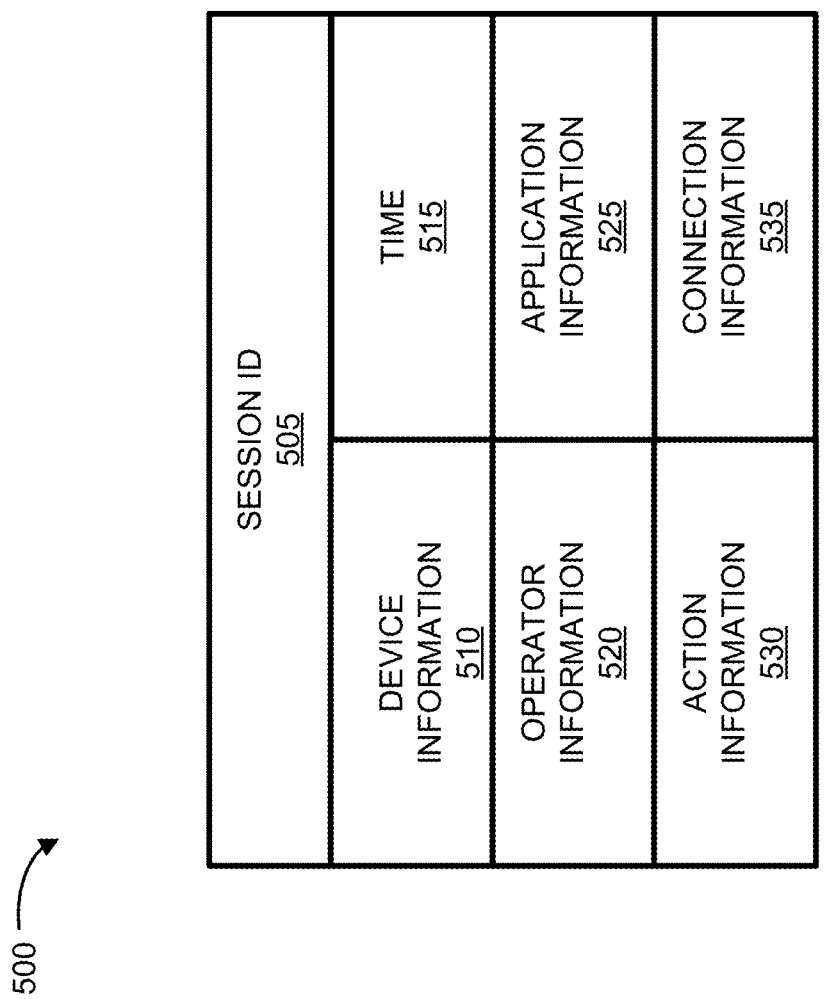
FIG. 5 is a diagram of an example record that stores information associated with a network management activity.

FIG. 5 is a diagram of an example record 500 that stores information associated with a network management activity. Record 500 may be stored in records storage 430 (FIG. 4). As shown in FIG. 5, record 500 may include a collection of fields, such as a session identifier (ID) field 505, a device information field 510, a time field 515, an operator information field 520, an application information field 525, an action information field 530, and/or a connection information field 535.

The quantity of fields in record 500 is included for explanatory purposes. In practice, record 500 may include additional fields, fewer fields, and/or different fields than are described with respect to record 500.

Session ID field 505 may include information that uniquely identifies a session associated with a network management activity performed by using network device 110. The network management activity may occur during the session. Device information field 510 may store information (e.g., a device identifier (ID), an Internet protocol (IP) address, etc.) associated with network device 110. Time field 515 may identify a first time at which the network management activity was started and/or a second time at which the network management activity ended.

Operator information field 520 may store information that identifies an operator of network device 110, such as a network administrator, who used network device 110 to perform the network management activity. Operator information field 520 may include, for example, a username, a password, a personal identification number (PIN), etc. In some instances, the network management activity may be initiated automatically by network device 110 (e.g., when network device 110 receives a particular type of file from another network device 110). In these instances, operator information field 520 may not include any information or may indicate that the network management activity was initiated automatically by network device 110.

Application information field 525 may store information that identifies an application of network device 110 used to perform the network management activity. Additionally, or alternatively, application information field 525 may store a type of the session associated with the network management activity. The type of the session may correspond to a type of the application.

Action information field 530 may store information that identifies one or more actions that were performed, during the session, in order to initiate and/or complete the network management activity. Action information field 530 may include, for example, information about one or more of command(s) received by network device 110 during the session, type(s) of configuration(s) pushed to network device 110 during the session, and/or types of SNMP requests received by network device 110 during the session. Additionally, or alternatively, action information field 530 may store information associated with a configuration change implemented on network device 110. The information associated with the configuration change may identify a type of configuration change and/or types of job(s) associated with the network management activity (e.g., update security protocols, forwarding protocols, a VLAN configuration, a Quality of Service (QoS) policy, etc.).

Connection information field 535 may store information that specifies a type of connection used by the operator to interact with network device 110 while performing the network management activity. Connection information field 535 may, for example, identify one or more of an outbound secure shell (SSH) connection, an inbound SSH connection, a Telnet connection, a web management connection, etc.

Figure 6:
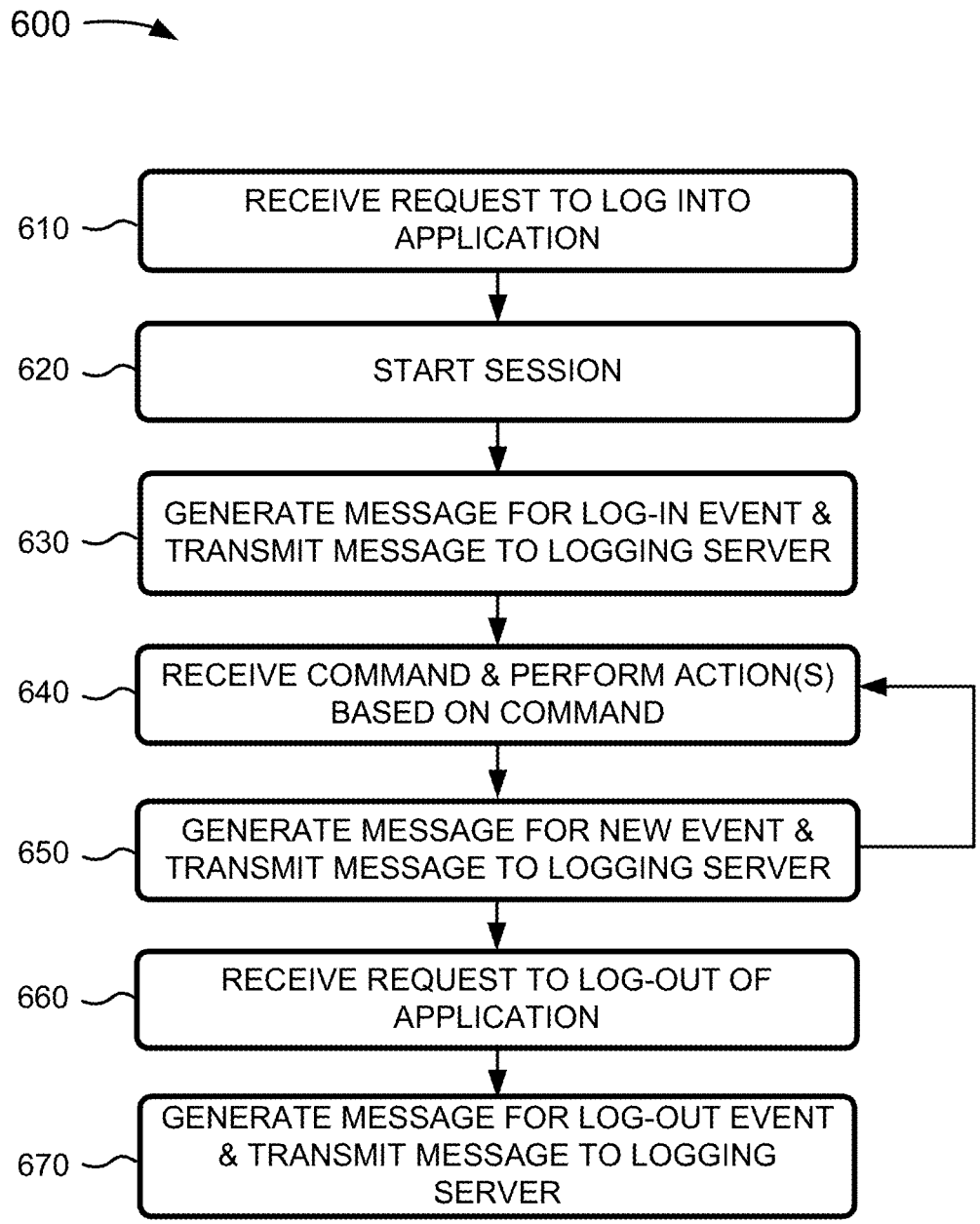
FIG. 6 is a flow chart of an example process for generating and transmitting messages associated with a network management activity.

FIG. 6 is a flow chart of an example process 600 for generating and transmitting messages associated with a network management activity. In one example implementation, process 600 may be performed by network device 110. In another example implementation, some or all of process 600 may be performed by a device or collection of devices separate from, or in combination with, network device 110.

As shown in FIG. 6, process 600 may include receiving a request to log into an application (block 610) and starting a session (block 620). For example, an operator may use client device 130 to open a particular type of interface, such as a graphical user interface (GUI) or a command line interface (CLI). The operator may use the interface to establish a particular type of connection, such as a SSH connection, with network device 110. The operator may enter, into the interface, a request to log into a particular application, of network device 110. Client device 130 may transmit the request to network device 110 via the particular type of connection. Network device 110 may receive the request from client device 130. In response to the request, network device 110 may start a session during which the operator may use the particular application to perform a network management activity. Starting the session may include assigning a session ID that uniquely identifies the session and logging into the particular application so that the operator may use the application via the interface.

Process 600 may further include generating a message for a log-in event and transmitting the message to a logging server (block 630). For example, the particular application, of network device 110, may generate a first message for a log-in event (e.g., when network device 110 logged into the application). The first message may include one or more parameters, including a tag that identifies the log-in event (e.g., a login event tag), a client mode value that identifies the particular type of interface used by the operator to interact with network device 110 via client device 130, a process name that identifies a type of a process used by network device 110 to perform the log-in, the session ID, information that identifies network device 110, information that identifies the operator, information that identifies the application, information that identifies a type of action associated with the log-in, information that identifies the particular type of connection used by client device 130 to connect to network device 110, a primary process identifier (pid) that identifies the process used by the particular application for the log-in, etc. Network device 110 may transmit the first message to logging server 120.

Process 600 may also include receiving a command and performing one or more actions based on the command (block 640). For example, the operator may enter, into the interface, a command to use the particular application to configure network device 110. Client device 130 may transmit the command to network device 110. Network device 110 may receive the command, and the particular application, of network device 110, may perform one or more actions to configure network device 110 based on the command.

Process 600 may also include generating a message for a new event and transmitting the message to the logging server (block 650). For example, the particular application, of network device 110, may generate a second message for a new event (i.e., when network device 110 performs the one or more actions based on the command). The second message may include a tag that identifies a type of the command (e.g., a configuration command tag), information that identifies the one or more actions, and/or other information associated with the configuration of network device 110. In one example, the second message may include information identifying every action taken by the operator and/or every change made to network device 110. The second message may further include one or more of the types of parameters that are described above as possibly being included in the first message. The second message may also include a secondary pid. The secondary pid may identify a process used by the particular application for the new event, and/or may include a reference to the primary pid that is included in the first message. Network device 110 may transmit the second message to logging server 120.

Network device 110 may continue to receive commands, perform actions based on the commands, and generate new messages associated with the commands and/or the actions. The new messages may include the same types of information as described above as possibly being included in the second message. Network device 110 may transmit the new messages to logging server 120.

Process 600 may also include receiving a request to log-out of the application (block 660). For example, the operator may enter a request, to log-out of the particular application, into the interface. Client device 130 may transmit the request, to log-out of the particular application, to network device 110. Network device 110 may receive the request from client device 130. In response to the request, network device 110 may log out of the particular application, and may end the session.

Process 600 may also include generating a message for a log-out event and transmitting the message to the logging server (block 670). For example, the particular application, of network device 110, may generate a final message for the log-out event (e.g., when network device 110 logs out of the application). The final message may include one or more parameters, including a tag that identifies the log-out event (e.g., a log-out event tag) and/or one or more other types of parameters that are described above as possibly being included in the first message and/or the second message. Network device 110 may transmit the final message to logging server 120. Logging server 120 may generate a record, for the network management activity that occurred during the session, based on information included in the first message, the second message, the other new messages, and/or the final message.

Figure 7:
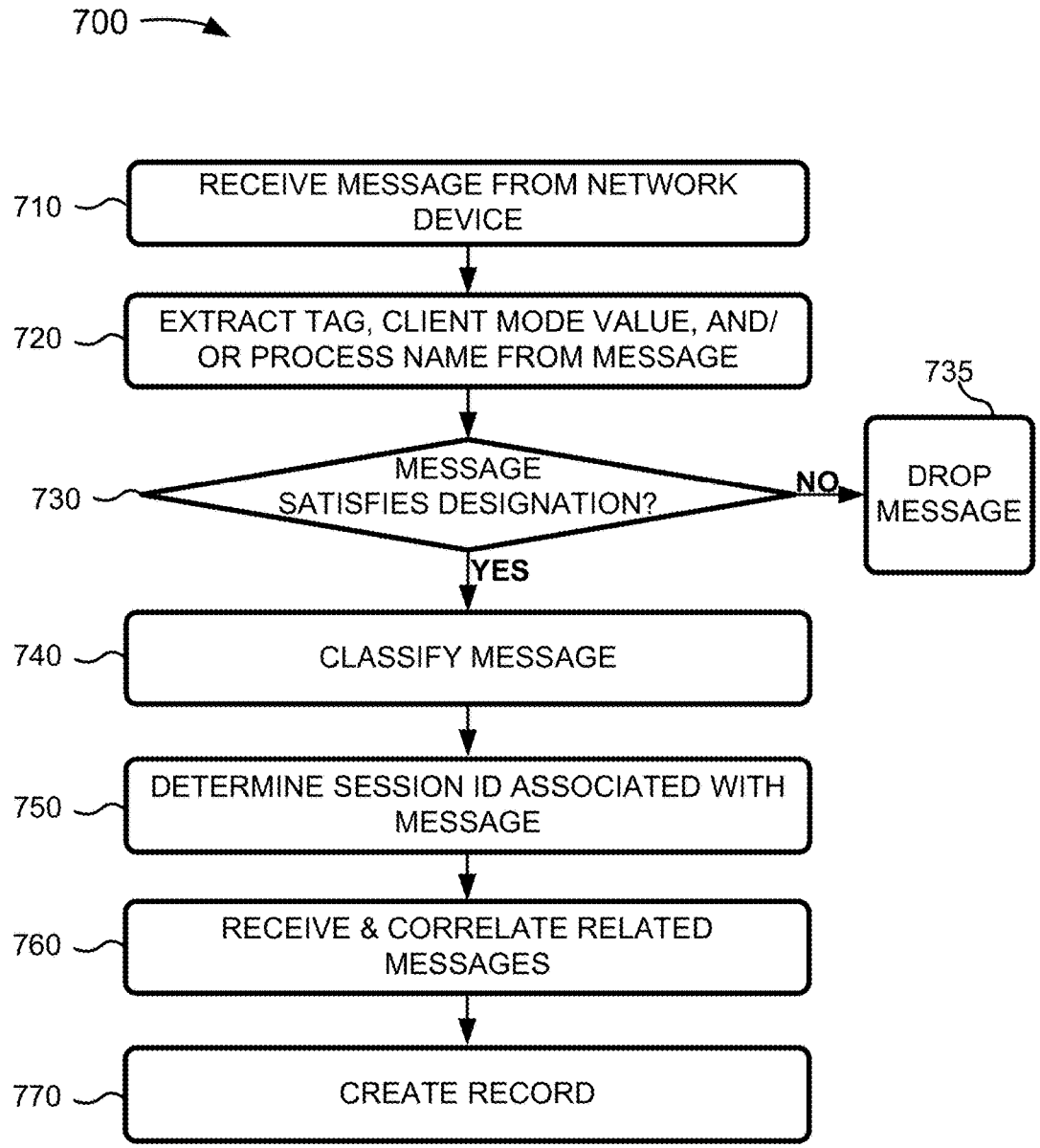
FIG. 7 is a flow chart of an example process for creating a record.

FIG. 7 is a flow chart of an example process 700 for creating a record. In one example implementation, process 700 may be performed by logging server 120. In another example implementation, some or all of process 700 may be performed by a device or collection of devices separate from, or in combination with, logging server 120.

As shown in FIG. 7, process 700 may include receiving a message from a network device (block 710) and extracting a tag, a client mode value, and/or a process name from the message (block 720). In one implementation, an operator may use network device 110 to perform a network management activity. Network device 110 may generate a first message associated with an event (e.g., a log-in event), and may transmit the first message to logging server 120. Logging server 120 may receive the first message from network device 110. The first message may include a tag, a client mode value, a process name, and/or one or more other types of parameters associated with the event. Network device 110 may extract the tag, the client mode value, and/or the process name from the first message.

The tag may indicate, for example, a type of the event associated with the first message. The tag may include, for example, a log-in event tag, a log-out event tag, an extensible markup language (XML) based protocol command tag, a network configuration protocol (NETCONF) command tag, a command line read line tag, a database log-in event tag, a database log-out event tag, a login information tag, a configuration audit settings tag, etc.

The client mode value may indicate, for example, a type of an interface that the operator used on client device 130, to interact with network device 110, during the event associated with the first message. The client mode value may include, for example, a value that corresponds to a NETCONF graphical user interface (GUI), a value that corresponds to an XML based protocol interface, a value that corresponds to a command line interface (CLI), etc.

An application (e.g., network management application 310 (FIG. 3)) of network device 110 may use various processes to perform the network management activity. The process name may identify, for example, a type of process that is used, by network device 110, to perform the event associated with the first message. For example, a first process name may identify a first type of process that is used, by network device 110, when the operator enters a command. A second process name may identify a second type of process that is used, by network device 110, when network device 110 receives a file.

Returning to FIG. 7, process 700 may further include determining whether the message satisfies a criterion (block 730). In one implementation, logging server 120 may store characteristics of a particular type of message that satisfies a criterion. For example, the characteristics may specify that the particular type of message includes a particular tag, a particular client mode value, and/or a particular process name. Logging server 120 may determine whether the first message satisfies the criterion based on the characteristics and the parameters extracted from the first message. Further to the example above, logging server 120 may determine that the first message satisfies the criterion when the extracted tag matches the particular tag, when the extracted client mode value matches the particular client mode value, and/or when the extracted process name matches the particular process name.

If the message does not satisfy the criterion (block 730-NO), process 700 may include dropping the message (block 735). In one implementation, when logging server 120 determines that the first message does not satisfy the criterion, logging server 120 may drop the first message. In one example, dropping the first message may include removing the first message from logging server 120 and ending process 700. In another example, dropping the first message may include storing the first message and ending process 700.

If the message satisfies the criterion (block 730—YES), process 700 may include classifying the message (block 740). In one implementation, when logging server 120 determines that the first message satisfies the criterion, logging server 120 may classify the first message. For example, logging server 120 may classify the first message based on a type of the application used by network device 110 to perform the network management activity.

In one example, logging server 120 may determine the type of the application based on one or more parameters included in the first message. For example, logging server 120 may determine that the application is of a particular type when the first message includes the extracted client mode value and the extracted tag (e.g., a log-in event tag). In this example, logging server 120 may classify the first message as being associated with the particular type of the application.

In another example, the first message may include a value that identifies a particular type of application. Logging server 120 may extract the value from the first message, and may classify the first message as being associated with the particular type of the application based on the value.

Process 700 may also include determining a session ID associated with the message (block 750). In one implementation, the first message may also include a session ID that identifies a session associated with the network management activity. Logging server 120 may extract the session ID from the first message.

Process 700 may also include receiving and correlating related messages (block 770). In one implementation, after classifying the first message, logging server 120 may receive other messages from network device 110, and may identify messages that are associated with the same session as the first message. Further to the example above, the first message may be for a log-in event, and may include a primary pid. Logging server 120 may receive a second message for a different event (e.g., that occurred when the operator entered a command). The second message may include, for example, a command tag and a secondary pid. The secondary pid may include a reference to the primary pid of the first message. Logging server 120 may determine that the second message is for the same session as the first message based on the command tag and/or the secondary pid. Logging server 120 may correlate the second message to the first message since the first message and the second message are related to the same session. In this manner, logging server 120 may continue to receive and correlate one or more other messages that are related to the first message. In one example, logging server 120 may determine that there are no more messages to receive and correlate after receiving and correlating a final message for a log-out event.

Process 700 may also include creating a record (block 770). In one implementation, one or more of the correlated messages may include different pieces of information associated with the network management activity. In one example, the first message may include the session ID; the second message may identify the command entered by the operator and/or include device information (e.g., an IP address) associated with network device 110; a third message, of the correlated messages, may identify one or more actions performed by network device 110 and/or include the connection information; etc. In another example, the first message may include the device information (e.g., the IP address and a port associated with network device 110) and operator information (e.g., a user ID) associated with the operator of network device 110; the second message may indicate that the operator used the application to enter a particular mode for editing a database; a third message, of the correlated messages, may indicate that the operator exited the particular mode; etc.

Logging server 120 may store rules (e.g., associated with the type of the application) that specify which ones of the correlated messages include which types of information (e.g., the session ID, the device information, etc.) and/or where the information is included in the correlated messages. Logging server 120 may extract the information from the correlated messages based on the rules. Additionally, or alternatively, logging server 120 may use some of the extracted information to determine additional information associated with the network management activity. For example, logging server 120 may extract, from one of the correlated messages, an IP address of a south-bound interface of network device 110. Logging server 120 may use the extracted IP address to determine a virtual IP address associated with network device 110. Logging server 120 may create the record (e.g., record 500 shown in FIG. 5) based on the extracted information and/or the additional information determined by logging server 120.

Figure 8:
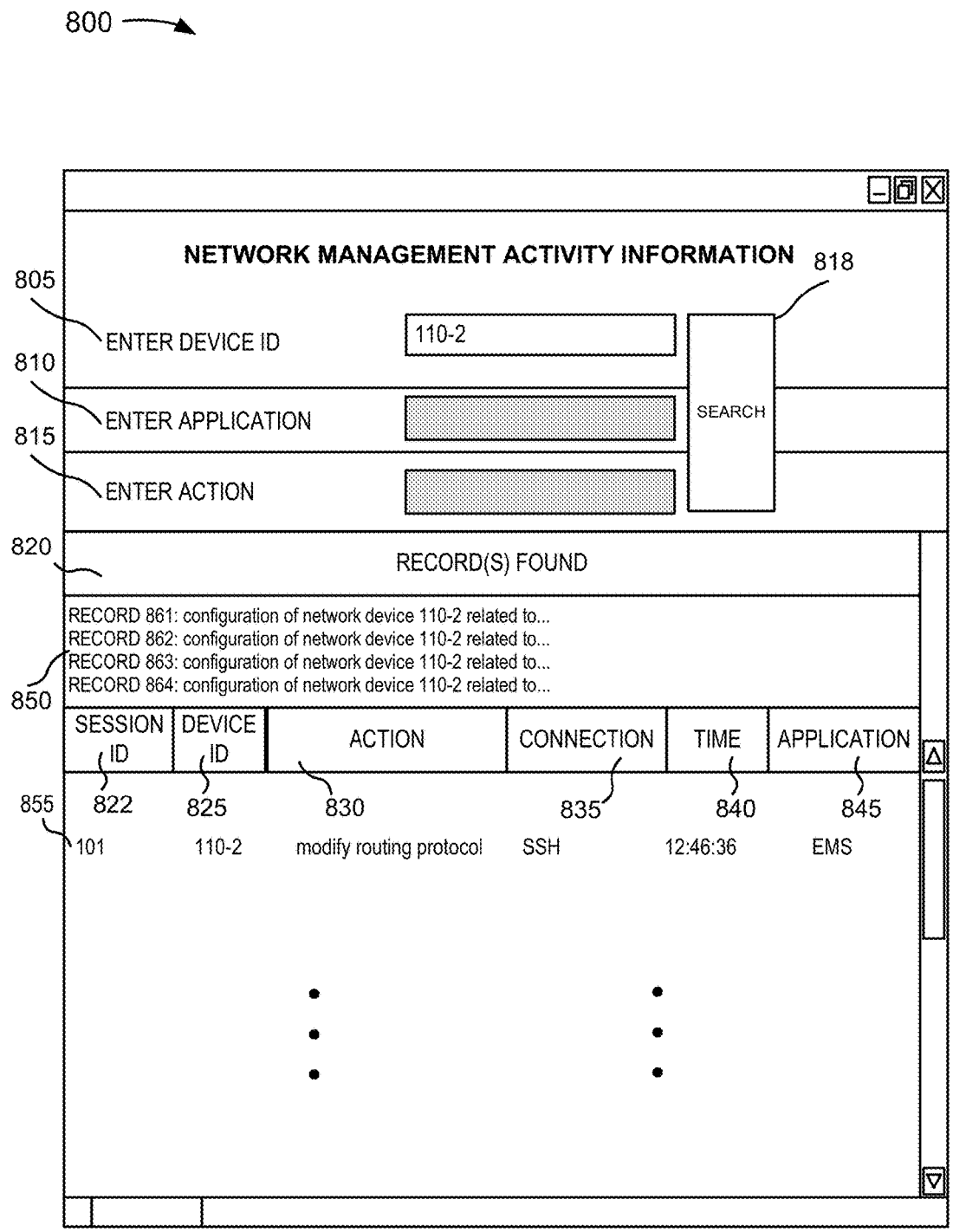
FIG. 8 is a diagram of an example user interface that allows an operator to view information associated with a network management activity.

FIG. 8 is a diagram of an example user interface 800 that allows an operator to view information associated with a network management activity. As shown in FIG. 8, user interface 800 may include a collection of fields and/or buttons, such as a device ID search field 805, an application search field 810, an action search field 815, a search button 818, a records found field 820, a session ID field 822, a device ID field 825, an action information field 830, a connection information field 835, a time field 840, and an application information field 845.

The quantity of fields and/or buttons, included within user interface 800, is provided for explanatory purposes. In another example implementation, there may be fewer fields and/or buttons, additional fields and/or buttons, different fields and/or buttons, and/or differently arranged fields and/or buttons than shown in FIG. 8.

Device ID search field 805 may allow an operator to enter a search query based on a device ID associated with a particular network device 110. Application search field 810 may allow the operator to enter a search query based on a type of application used for network management activities. Action search field 815 may allow the operator to enter a search query based on a type of action performed during the network management activities.

Search button 818 may, when selected by the operator, cause logging server 120 to initiate a search based on the device ID entered into device ID search field 805, the application type entered into application information search field 810, and/or the type of action entered into action information search field 815. In another example implementation, device ID search field 805, application information search field 810, and/or action information search field 815 may be combined into a single field.

Records found field 820 may identify one or more records 850 that logging server 120 identifies as relevant to the search query entered into user interface 800 by the operator. Session ID field 822, device ID field 825, action information field 830, connection information field 835, time field 840, and application information field 845 may include information from, for example, a record 861 that is selected by the operator from records 850. Record 861 may correspond to record 500 (FIG. 5).

Session ID field 822 may correspond to information in session ID field 505 (FIG. 5) of record 861. Device ID field 825 may correspond to device information field 510 (FIG. 5) of record 861. Action field 830 may correspond to information in action information field 530 (FIG. 5) of record 861. Connection field 835 may correspond to information in connection information field 535 (FIG. 5) of record 861. Time field 840 may correspond to information in time field 515 (FIG. 5) of record 861. Application information field 845 may correspond to information in application information field 525 (FIG. 5) of record 861. Additionally, or alternatively, user interface 800 may include other fields, such as an operator information field, etc. The operator information field may correspond to information in operator information field 520 (FIG. 5) of record 861.

Figure 9:
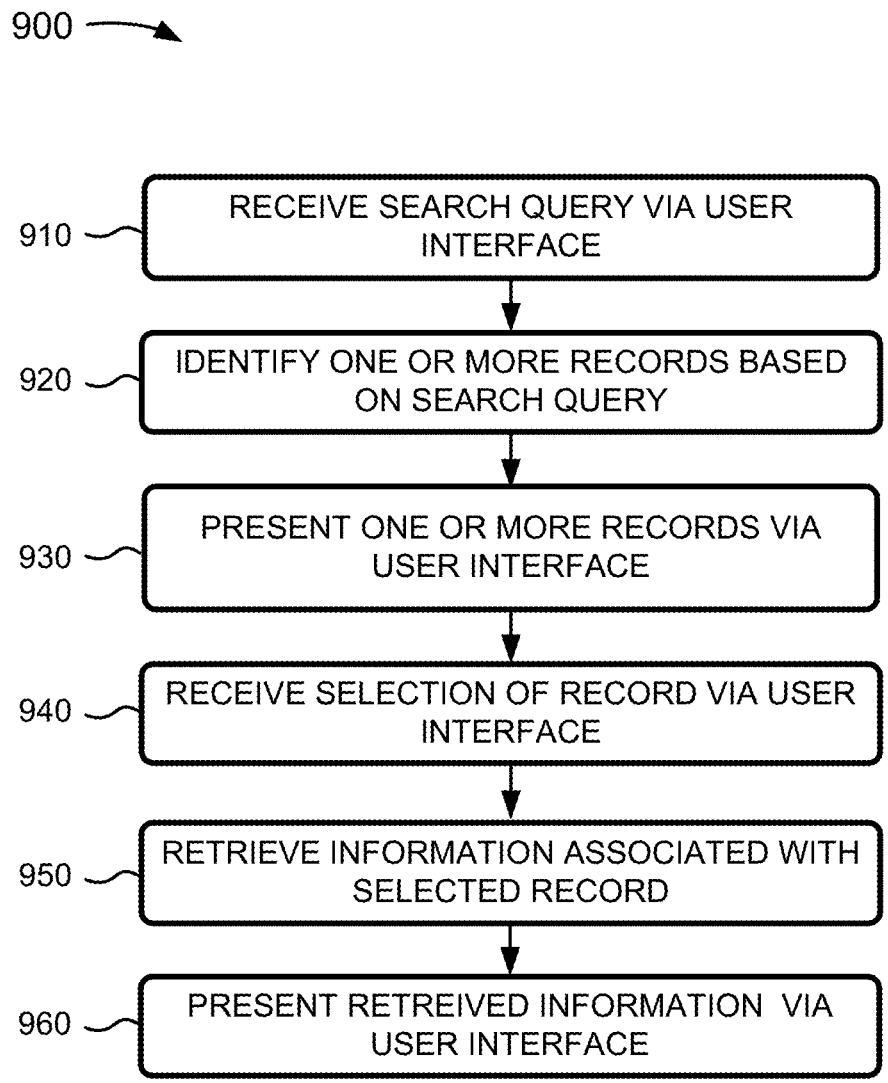
FIG. 9 is a flow chart of an example process for presenting information of a record.

FIG. 9 is a flow chart of an example process 900 for presenting information of a record. In one example implementation, process 900 may be performed by logging server 120. In another example implementation, some or all of process 900 may be performed by a device or collection of devices separate from, or in combination with, logging server 120. A portion of process 900 of FIG. 9 will be described below with references to user interface 800 of FIG. 8.

As shown in FIG. 9, process 900 may include receiving a search query via a user interface (block 910) and identifying one or more records based on the search query (block 920). For example, an operator (e.g., a network administrator) may send a request to logging server 120 to search for information associated with network management activities. In response to the request, logging server 120 may provide a user interface (e.g., user interface 800) that allows the operator to enter a search query.

As described above with reference to FIG. 8, the operator may enter a device ID (e.g., 110-2) into device ID search field 805, a type of application into application information search field 810, and/or a type of action into action information field 815. The operator may select search button 818, which may cause logging server 120 to receive the search query. The search query may include the device ID, the type of application, and/or the type of action. Logging server 120 may perform a search of stored records by comparing the search query with the stored records. Logging server 120 may identify one or more records 850 that include the device ID, the type of application, and/or the type of action included in the search query.

As further shown in FIG. 9, process 900 may include presenting the one or more records via the user interface (block 930) and receiving a selection of a record via the user interface (block 940). For example, logging server 120 may present for display, via the user interface, records 850 in records found field 820. The operator may select, for example, record 861 in records found field 820, and logging server 120 may receive a selection of record 861 via user interface 800.

Process 900 may also include retrieving information associated with the selected record (block 950) and presenting the retrieved information via the user interface (block 960). For example, logging server 120 may retrieve network management activity information 855 from record 861. Logging server 120 may present network management activity information 855 via user interface 800.

Network management activity information 855 may include a session ID (e.g., 101), a device ID (e.g., 110-2), a type of action (e.g., modify routing protocol), a type of connection (e.g., SSH), a time (e.g., 12:46:36) associated with the network management activity, and a type of application (e.g., EMS) used to perform the network management activity. Additionally, or alternatively, logging server 120 may present other network management activity information from a record 862, a record 863, and/or a record 864.

In one implementation, the operator may use records 850 and/or network management activity information 855 to identify a condition associated with network device 110 and/or to troubleshoot a condition that has been detected on network 100. In one example, records 850 and/or network management activity information 855 may allow the operator to determine that a particular action, corresponding to a record, that may be causing a problem in network 100. In another example, records 850 and/or network management activity information 855 may allow the operator to identify actions, performed by network device 110, that are in conflict or cause network device 110 to establish policies or protocols that are not compatible with network device 110. In yet another example, records 850 and/or network management activity information 855 may allow the network administrator to identify a record or network management activity information associated with an action that was performed, by network device 110, at a time when network device 110 began to malfunction.

A system and/or method, described herein, may enable collection of information associated with network management activities performed using different types of applications of network devices 110. A network administrator may access the collected information to, for example, fix and/or prevent problems within network 100.

The foregoing description of implementations provides illustration and description, but is not intended to be exhaustive or to limit the implementations to the precise form disclosed. Modifications and variations are possible in light of the above teachings or may be acquired from practice of these implementations.

For example, while series of blocks have been described with regards to FIGS. 6 and 8, the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a computing device and from a network device, a particular message;
   extracting, by the computing device, a tag and a particular identifier from the particular message;
   determining, by the computing device and based on the tag, that the particular message is for a log-in event that includes logging into an application of the network device;
   receiving, by the computing device and from the network device, one or more messages that are for one or more events, of a network management activity that occurs during a session that is associated with the log-in event, until the computing device receives a log-out message that is for a log-out event that is associated with the network management activity;
   correlating, by the computing device and to obtain correlated messages, a plurality of messages associated with the session based on the particular identifier and one or more other identifiers included in the one or more messages,
      the plurality of messages including the one or more messages and the particular message;
   determining, by the computing device, particular rules associated with a type of the application; and
   creating, by the computing device, a record for the network management activity based on the correlated messages and by using the particular rules.

2. The method of claim 1, further comprising:
   receiving a search query from a client device;
   identifying the record based on the search query; and
   providing, for presentation and to the client device, information from the record.

3. The method of claim 2,
   where the search query comprises one or more of:
      first information associated with the network device,
      second information associated with the application, or
      third information associated with an action performed during a particular event of the one or more events, and
   where identifying the record based on the search query comprises:
      identifying the record based on one or more of the first information, the second information, or the third information.

4. The method of claim 1, further comprising:
   extracting another parameter from the particular message;
   determining that the particular message satisfies a criterion based on the tag or the other parameter, the other parameter identifying a type of an interface used, by an operator of the network device, to interact with the network device during the log-in event; and classifying, after determining that the particular message satisfies the criterion, the particular message for the particular message to be correlated with the one or more messages to be received by the computing device after the particular message.

5. The method of claim 4, where determining that the particular message satisfies the criterion comprises:
   determining that a first value of the tag matches a first particular value,
   determining that a second value of the other parameter matches a second particular value, and
   determining that the particular message satisfies the criterion based on the first value matching the first particular value and the second value matching the second particular value.

6. The method of claim 1, further comprising:
   extracting a parameter from the particular message, and
   determining the type of the application based on a value of the parameter,
      the application being an element management system (EMS) application or a network management systems (NMS) application.

7. The method of claim 1, where at least one identifier, of the one or more other identifiers, includes a reference to the particular identifier.

8. The method of claim 1, where creating the record comprises:
   determining device information associated with the network device based on the particular message or one of the one or more messages, and
   including the type of the application and the device information in the record.

9. The method of claim 1, further comprising:
   receiving, from the network device or a different network device, another message associated with a second network management activity performed by using a second application,
      a type of the second application being different from the type of the application used to perform the network management activity;
   determining whether the other message satisfies a criterion;
   classifying, when the other message satisfies the criterion, the other message to be correlated with one or more other messages associated with the second network management activity,
      the other message being dropped when the other message does not satisfy the criterion; correlating, when the other message satisfies the criterion, the other message with the one or more other messages after classifying the other message; and
   creating, when the other message satisfies the criterion, a second record for the second network management activity based on the other message and the one or more other messages.

10. A device comprising:
    a processor that is programmed to:
       receive, from a network device, a log-in message,
       extract a tag from the log-in message,
       determine, based on the tag, that the log-in message is for a log-in event that includes logging into an application of the network device,
       receive, from the network device and after determining that the log-in message is for the log-in event, one or more event messages that are for one or more events, of a network management activity that occurs during a session that is associated with the log-in event, until the device receives a log-out message that is for a log-out event that is associated with the network management activity,
       correlate, to obtain correlated messages, a plurality of messages associated with the session,
          the session corresponding to a session identifier that is included in the plurality of messages, and
          the plurality of messages including two or more of the log-in message, the one or more event messages, or the log-out message,
       determine particular rules associated with a type of the application, and
       create a record for the network management activity based on at least two or more of the correlated messages by using the particular rules.

11. The device of claim 10,
where the log-in event message satisfies a criterion, and
where the processor is further programmed to:
   receive another log-in event message associated with another application,
   determine that the other log-in event message does not satisfy the criterion, and
   drop the other log-in event message based on determining that the other log-in event message does not satisfy the criterion.

12. The device of claim 10,
where the processor is further programmed to:
   receive a search query,
   identify the record based on the search query, and
   provide, for display, information from the record,
where the search query comprises one or more of:
   first information associated with the network device,
   second information associated with the application, or
   third information associated with an action performed during a particular event of the one or more events, and
where, when identifying the record based on the search query, the processor is programmed to:
   identify the record based on one or more of the first information, the second information, or the third information.

13. The device of claim 10,
where, when creating the record, the processor is programmed to:
   determine the session identifier based on the log-in event message,
   determine device information associated with the network device based on the log-in event message or a particular message of the one or more event messages, and
   include an identifier associated with the application, the session identifier, and the device information in the record,
where the session identifier uniquely identifies the session associated with the network management activity, and
where the network management activity occurs during the session.

14. The device of claim 10,
where the processor is programmed to:
   extract another parameter from the log-in event message, determine that the log-in event message satisfies a criterion based on at least one of the tag or the other parameter, and classify, after determining that the log-in event message satisfies the criterion, the log-in event message for the log-in event message to be correlated with the one or more event messages, and where the other parameter identifies a type of an interface used, by an operator of the network device, to interact with the network device during the log-in event.

15. The device of claim 10, where the log-in event message comprises a first identifier, where a particular message, of the one or more event messages, comprises a second identifier, where the second identifier comprises a reference to the first identifier, and where, when correlating the plurality of messages, the processor is further programmed to:

correlate the particular message with the log-in event message based on the second identifier comprising the reference to the first identifier.

16. A non-transitory computer-readable media storing instructions, the instructions comprising:

one or more instructions that, when executed by one or more processors of a computing device, cause the one or more processors to:

receive, from a network device, a first message;

extract a tag from the first message;

determine, based on the tag, that the first message is for a log-in event that includes logging into an application of the network device;

receive, from the network device and after determining that the first message is for the log-in event, one or more second messages that are for one or more events, of a network management activity that occurs during a session that is associated with the log-in event, until the computing device receives a third message that is for a log-out event that includes logging out of the application;

correlate, to obtain correlated messages, a plurality of messages associated with the session based on one or more identifiers included in the plurality of messages, the plurality of messages including the first message, the one or more second messages, and the third message;

determine particular rules associated with a type of the application; and create a record for the network management activity based on the correlated messages by using the particular rules.

17. The media of claim 16, where the instructions further comprise:

one or more instructions that, when executed by the one or more processors, cause the one or more processors to:

receive at least one of first information associated with the network device, second information associated with the application, or third information associated with an action performed during a particular event of the one or more events, identify the record based on at least one of the first information, the second information, or the third information, and provide information from the record.

18. The media of claim 16, where the one or more instructions to create the record comprise:

one or more instructions that, when executed by the one or more processors, cause the one or more processors to:

determine device information associated with the network device based on the first message, and include an identifier associated with the application and the device information in the record.

19. The media of claim 16, where the instructions further comprise:

one or more instructions that, when executed by the one or more processors, cause the one or more processors to:

extract another parameter from the first message, determine whether the first message satisfies a criterion based on the other parameter, and classify the first message for the first message to be correlated with the one or more second messages after determining that the first message satisfies the criterion, the other parameter identifying a type of an interface used, by an operator of the network device, to interact with the network device during the log-in event.

20. The media of claim 16, where the instructions further comprise:

one or more instructions that, when executed by the one or more processors, cause the one or more processors to:

receive, from the network device or a different network device, a fourth message associated with a second network management activity performed by using a second application, determine that the fourth message satisfies a criterion, correlate the fourth message with one or more other messages associated with the second network management activity after determining that the fourth message satisfies the criterion, and create a second record for the second network management activity based on the fourth message and the one or more other messages.

* * * * *